Dec. 8, 1936.  A. A. KUCHER  2,063,171
REFRIGERATING APPARATUS
Filed Aug. 22, 1934  6 Sheets-Sheet 1

Inventor
ANDREW A. KUCHER
By Spence Hardman & Hehr.
Attorney

Dec. 8, 1936.  A. A. KUCHER  2,063,171
REFRIGERATING APPARATUS
Filed Aug. 22, 1934  6 Sheets-Sheet 2

Inventor
ANDREW A. KUCHER
By Spencer Hardman & Fish.
Attorney

Dec. 8, 1936. A. A. KUCHER 2,063,171
REFRIGERATING APPARATUS
Filed Aug. 22, 1934   6 Sheets-Sheet 3

Inventor
ANDREW A. KUCHER
By Spence Hardman & Fehr
Attorney

Dec. 8, 1936. A. A. KUCHER 2,063,171
REFRIGERATING APPARATUS
Filed Aug. 22, 1934 6 Sheets-Sheet 4

Inventor
ANDREW A. KUCHER
By Spencer Hardman & Fisher
Attorney

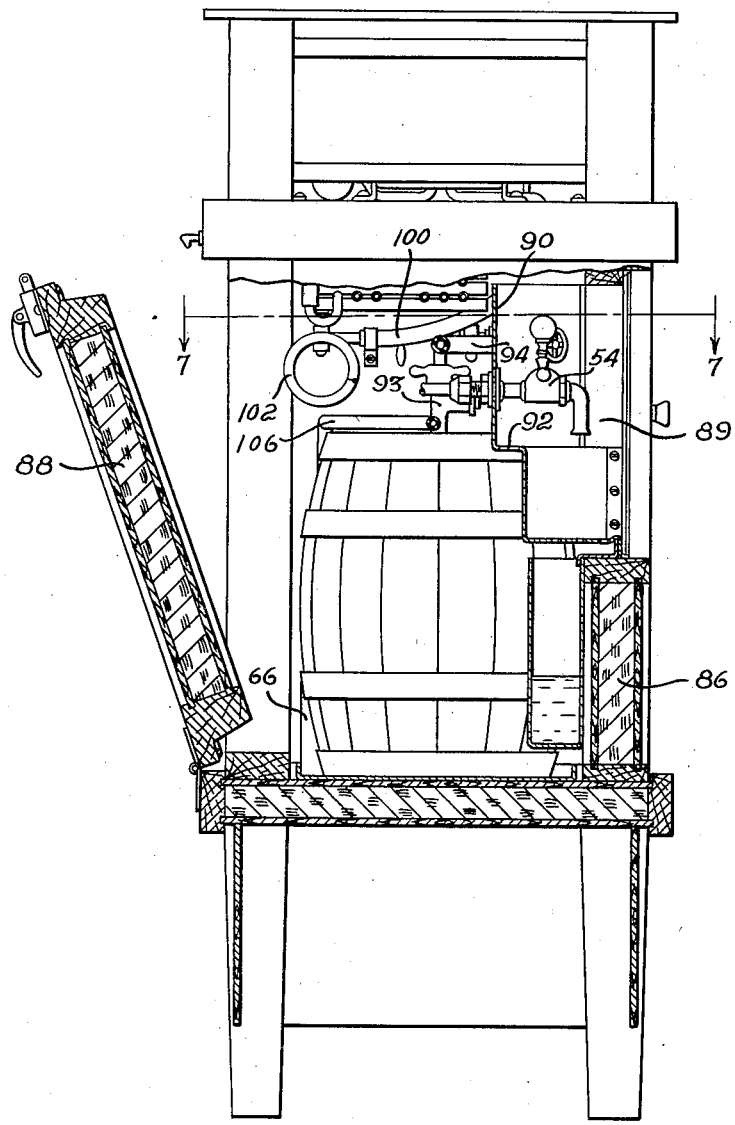

Dec. 8, 1936.   A. A. KUCHER   2,063,171
REFRIGERATING APPARATUS
Filed Aug. 22, 1934   6 Sheets-Sheet 6
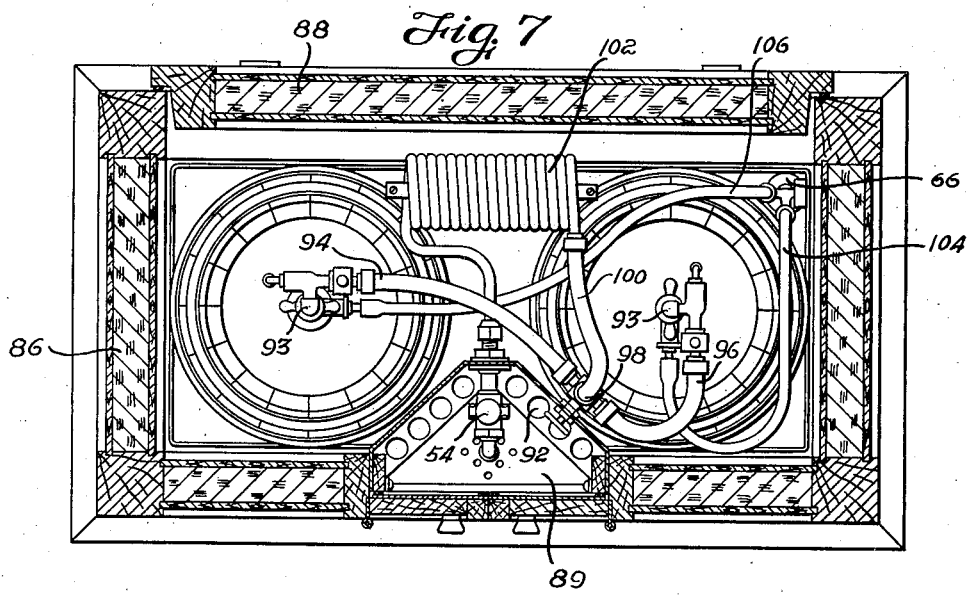
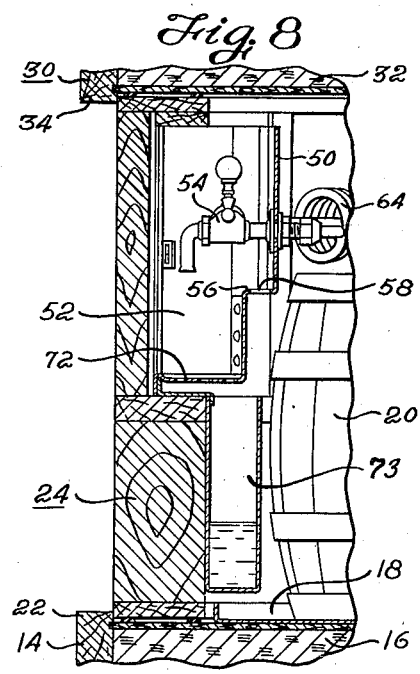
Inventor
ANDREW A KUCHER
By Spencer Hardman & Fish
Attorneys Patented Dec. 8, 1936

2,063,171

UNITED STATES PATENT OFFICE 2,063,171

REFRIGERATING APPARATUS

Andrew A. Kucher, Dayton, Ohio, assignor to General Motors Corporation, Dayton, Ohio, a corporation of Delaware Application August 22, 1934, Serial No. 740,974

20 Claims. (Cl. 225—1)

This invention relates to refrigerating apparatus and more particularly to a refrigerator for cooling beverages, such as beer.

It is an object of this invention to provide a unitary beverage cooling apparatus suitable for home use, which will maintain at the proper temperature for drinking, a quantity of beer or other beverage contained in a barrel of the usual size and in which is provided a unitary refrigerating apparatus to cool not only the barrel and the beverage contained therein, but also to maintain a dispensing faucet and the necessary connections refrigerated as well.

A further object is to provide a unitary household beverage cooling apparatus capable of cooling a barrel of beverage in which the replacement of an empty barrel with a filled one is facilitated and the lifting of the heavy barrel to a great height is eliminated.

It is also an object to provide a household beverage cooling apparatus comprising a cabinet adapted to contain the barrel or other container for beverage and having a dispensing faucet located within the cabinet, but accessible from the outside thereof and refrigerated by the same cooling means which cools the barrel.

Another object is to provide a household beverage cooling apparatus comprising a cabinet for containing a barrel or other container of beverage and having a compartment within the cabinet for the reception of a dispensing faucet without increasing the size of the cabinet over that otherwise necessary to refrigerate the beverage container.

Further objects and advantages of the present invention will be apparent from the following description, reference being had to the accompanying drawings, wherein a preferred form of the present invention is clearly shown.

In the drawings:

Fig. 6 is a side view partly in section of a further modification of the invention;

Fig. 7 is a horizontal cross section on line 7—7 of Fig. 6; and

Fig. 8 is a fragmentary cross section on line 8—8 of Fig. 4.

Figure 1:
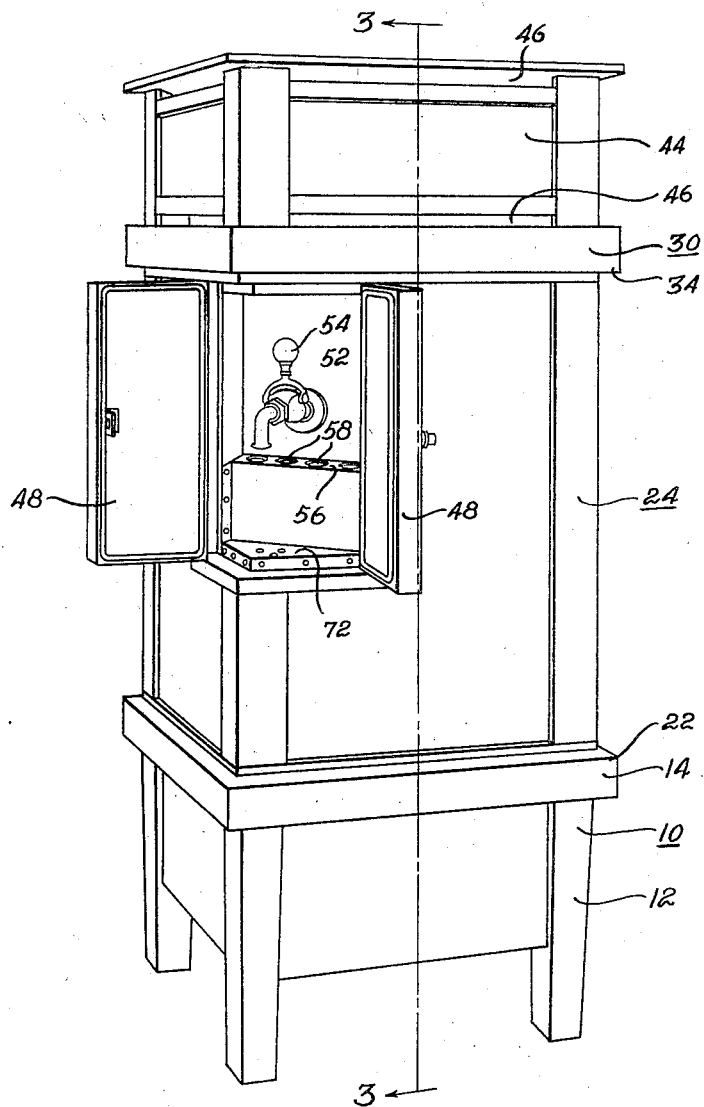
Fig. 1 is a perspective view of an embodiment of the present invention.
Figure 2:
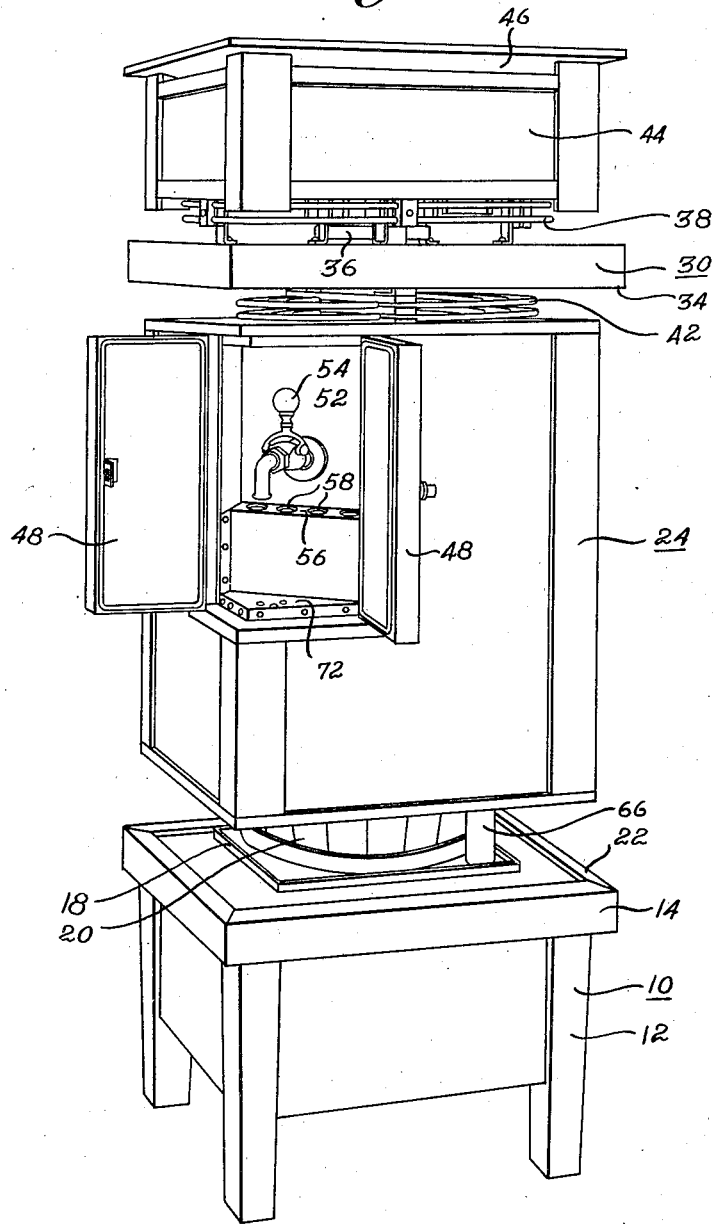
Fig. 2 is a view corresponding to Fig. 1 showing the manner in which the parts of the apparatus are disassembled.

Referring now to Figs. 1 to 4 inclusive, there is shown a beverage cooling apparatus which comprises generally a cabinet for the reception of a barrel and having in connection therewith a unitary refrigerating apparatus for cooling the interior of the cabinet. According to the present embodiment, the cabinet is formed of a base member 10 having legs 12 and a horizontal top wall 14, which is formed with insulating material 16. On the wall 14, there may be provided a shallow sheet metal pan 18 in which a barrel 20 may rest. The edges 22 of the top wall 14 form an upstanding rim around the top thereof within which is located the lower end of an intermediate cabinet member 24 which preferably comprises a plurality of side walls formed with insulating material 26. Gaskets 28 are provided between the intermediate section 24 and the top wall 14 of the base member 10. The dimensions of the intermediate section 24 are such that the interior thereof provides just sufficient room for a barrel of one of the standard sizes.

Above the intermediate section 24, there is provided the top section having a horizontal top wall 30 constructed with insulating material 32 and having its outer edges 34 slightly overhanging the top of the intermediate section 24 to insure proper location thereof. Gaskets 35 seal the joint between wall 30 and section 24. A unitary mechanical refrigerating apparatus is mounted on the wall 30 and may comprise, for example, a hermetically sealed rotary motor-compressor unit 36, a condenser 38 and control switches 40 mounted above the wall 30, together with an evaporating coil 42 mounted beneath the wall 30. A decorative housing 44 may enclose the parts of the refrigerating apparatus mounted above the wall 30 and is provided with ventilating openings 46 to insure proper cooling of the refrigerating apparatus therein.

At one corner of the intermediate section 24 closure means are provided comprising a pair of doors 48 adapted to close an opening in the intermediate cabinet member situated at the upper part thereof. A diagonal partition 50 of sheet metal is secured to the walls of the section 24 behind the doors 48 to provide a compartment 52 which is adapted to contain a dispensing faucet 54. The faucet 54 may be mounted directly on the partition 50. In order to provide refrigeration within the compartment 52, the partition 50 terminates somewhat short of the top of the intermediate section 24 and is further provided with a stepped portion 56 (see Fig. 1) having apertures 58 therein for providing circulation of air therethrough by natural convection. A tap rod 60 is provided in the barrel 20 in the usual manner and is connected by a flexible conduit 62 to a pressure reducing coil 64 which in turn connects at its other end with the faucet 54. A cylinder 66 containing carbon-dioxide or other gas under pressure is situated in one corner of the cabinet between the barrel and the cabinet and is connected by means of a pressure reducer 68 and flexible conduit 70 with the tap rod 60 to maintain a suitable pressure on the beverage within the barrel.

In practice for a cooler for beer, it has been found satisfactory to maintain a pressure of 12 to 14 pounds per square inch on the barrel and with a reducing coil formed of approximately 25 feet of one-half inch inside diameter tubing which has been flattened to a width of about half its normal diameter the beer dispensed from the faucet 54 is substantially all liquid and very little foam is produced. This may be attributed to the restriction provided by the coil 64 and to the maintenance of the beer at the proper cooled temperature, not only in the barrel and faucet but throughout the connections therebetween.

In operation, the refrigerating apparatus is supplied with electric current in the usual way and withdraws heat from the interior of the cabinet by the evaporation of refrigerant in the coil 42, the control switches 40 acting to operate the compressor intermittently to provide substantially constant temperatures therein. The reduced temperature in the coil 42 sets up convection currents in the air within the cabinet to cool not only the barrel and connections, but also to cool the faucet 54 and to provide a portion of circulating air which passes into and out of the compartment 52 through the perforations 58 in the partition 50 and over the top of the partition 50. The doors 48 are normally closed and when it is desired to draw beer or other beverage from the apparatus, these doors may be opened, giving access to the faucet 54 from which the beer may be drawn. The bottom of the compartment 52 is closed by a horizontal sheet metal partition 72 having perforations therein leading to a drip receptacle 73. The drip receptacle may be removed and emptied periodically or may be connected permanently to a suitable drain.

When the contents of the barrel 20 have been exhausted and it is desired to replace the empty barrel with a full one, the cabinet is disassembled by first removing the top wall 30 with the refrigerating apparatus attached thereto and then after removing the tap rod 60 from the barrel 20, the intermediate section 24 with the attached beverage connections may be bodily removed from the base 10. The barrel 20 is then easily lifted from the base 10 and a new one replaced thereon without the necessity of lifting a heavy barrel to a great height or difficult manipulation through a small door, as is necessary in other types of beverage coolers. The cabinet is then reassembled by a reversal of the operation above described, after which the apparatus is again ready for operation.

Figure 3:
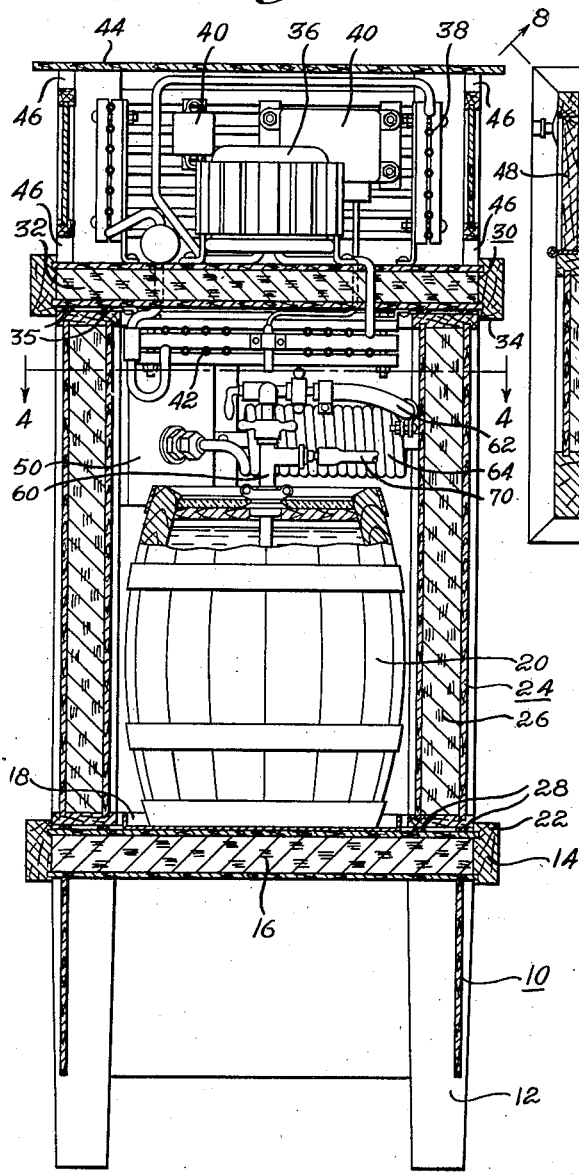
Fig. 3 is a vertical cross section on line 3—3 of Fig. 1.
Figure 4:
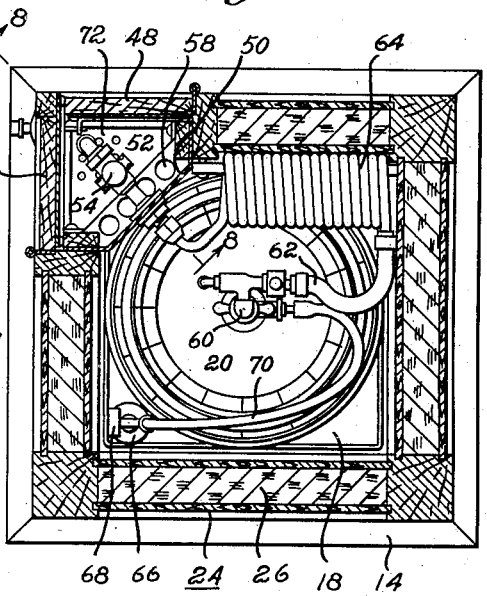
Fig. 4 is a horizontal cross section on line 4—4 of Fig. 3.
Figure 5:
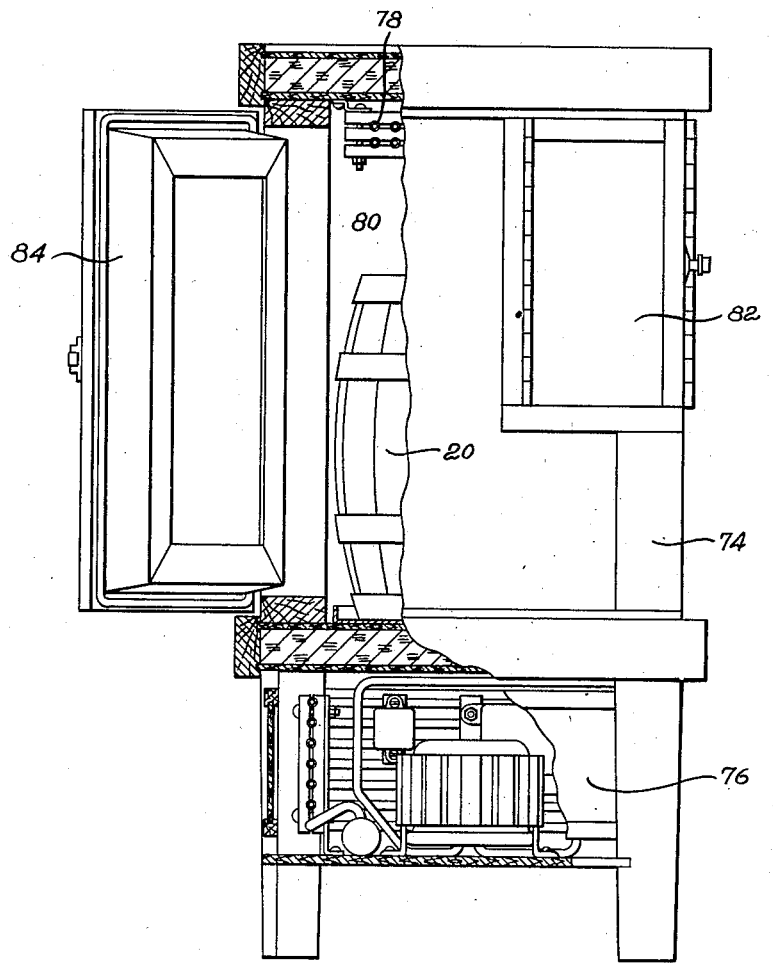
Fig. 5 is a side view partly in section of a modified form of the invention.

In the modification shown in Fig. 5, a beverage cooler is provided comprising a permanently assembled cabinet 74 having a lower machinery compartment 76 for the reception of the refrigerant liquefying unit corresponding to that located above the wall 30 in Fig. 3. The refrigerant evaporator 78 is located in the upper portion of a cooling compartment 80 provided in the cabinet 74 and is connected to the liquefying unit by conduits (not shown). The beverage dispensing apparatus is the same in this modification as in that described previously, the faucet 54 being accessible through the doors 82 corresponding to the doors 48 in Fig. 4. Replacement of the barrel 20 is permitted by the provision of a hinged door 84 at the rear of the cabinet, which is normally closed during operation of the cooler.

In the modification disclosed in Figs. 6 and 7, a household beverage cooler is provided for the reception and cooling of two barrels or other containers of beverage. In a cooler having a capacity for only the single barrel, it frequently happens that the contents of the barrel become exhausted at the wrong time, inasmuch as it is impossible to determine how much beverage is contained in the barrel at any time. In order to obviate this difficulty, the present modification provides a permanently assembled cabinet 86 of sufficient size to contain two barrels or other containers side by side. Replacement of the barrels may be permitted by the provision of a downwardly opening hinged door 88 at the rear of the cabinet. The refrigerating unit may be substantially the same as that disclosed in Fig. 1, and the cabinet, conveniently, may have the top wall similarly removable to provide for servicing or replacing the refrigerating apparatus when necessary. The faucet containing compartment 89 may be provided at the middle of the front wall of the cabinet and is formed by a partition 90 generally formed into a right angle to occupy the triangular space between the two barrels and the front wall of the cabinet. Circulation of air through the compartment 89 is provided in a manner similar to that shown in Fig. 3 by the apertures 92 and by terminating the partition 90 short of the top wall of the cabinet. The dispensing connections comprise a tap rod 93 for each barrel with flexible connections 94 and 96 leading from each tap rod to a two-way valve 98, mounted on the partition 90 with its handle projecting into the compartment 89. A flexible conduit 100 connects with the outlet of the valve 98 and a pressure reducing coil 102 similar to the coil 64 of Fig. 4. The opposite end of coil 102 is connected to the faucet 54. A compressed gas tank 66 is located at one corner of the cabinet and connects by flexible conduits 104 and 106 to each of the tap rods 93.

The operation of the present modification is substantially the same as that previously described, except that upon the contents of one barrel becoming exhausted, the two-way valve 98 is operated to connect the coil 102 with the other barrel. Before the other barrel is exhausted, the first barrel may be replaced by a filled one through the door 88.

Thus, it will be seen that the present invention provides a beverage cooling apparatus which is readily adapted to household use in that the apparatus is a complete unitary structure embodying all the elements necessary to provide for dispensing a cooled beverage therefrom and for maintaining a plentiful supply of beverage properly refrigerated at all times.

While the form of embodiment of the invention as herein disclosed, constitutes a preferred form, it is to be understood that other forms might be adopted, all coming within the scope of the claims which follow.

What is claimed is as follows:

1. In a beverage cooling and dispensing apparatus, the combination of a rectangular cabinet adapted to receive means containing a beverage to be cooled and dispensed, means for cooling the interior of the cabinet, a vertical partition having at least a major portion thereof disposed diagonally with respect to the cabinet walls to define a faucet receiving compartment within the cabinet and a beverage dispensing faucet mounted in said compartment.

2. In a beverage cooling and dispensing apparatus, the combination of a rectangular cabinet adapted to receive means containing a beverage to be cooled and dispensed, means for cooling the interior of the cabinet, a vertical partition having at least a major portion thereof disposed diagonally with respect to the cabinet walls to define a faucet receiving compartment within the cabinet, a beverage dispensing faucet mounted in said compartment, and means for maintaining a circulation of cooled air through said compartment.

3. In a beverage cooling and dispensing apparatus, the combination of a rectangular cabinet adapted to receive means containing a beverage to be cooled and dispensed, means for cooling the interior of the cabinet, a vertical partition having at least a major portion thereof disposed diagonally with respect to the cabinet walls to define a faucet receiving compartment within the cabinet, a beverage dispensing faucet mounted in said compartment, means for maintaining a circulation of cooled air through said compartment, and closure means in the cabinet giving access to the faucet.

4. In a beverage cooling and dispensing apparatus, the combination of a rectangular cabinet adapted to receive means containing a beverage to be cooled and dispensed, means for cooling the interior of the cabinet, a vertical partition having at least a major portion thereof disposed diagonally with respect to the cabinet walls to define a faucet receiving compartment within the cabinet, a beverage dispensing faucet mounted in said compartment, and closure means in the cabinet giving access to the faucet.

5. In a beverage cooling and dispensing apparatus, the combination of a rectangular cabinet adapted to receive means containing a beverage to be cooled and dispensed, means for cooling the interior of the cabinet, circular beverage containing means of a diameter substantially circumscribed by the interior rectangular walls of the cabinet, and a beverage dispensing faucet positioned in one of the substantially triangular prismatic spaces between the containing means and the interior walls of the cabinet.

6. In a beverage cooling and dispensing apparatus, the combination of a rectangular cabinet adapted to receive means containing a beverage to be cooled and dispensed, means for cooling the interior of the cabinet, circular beverage containing means of a diameter substantially circumscribed by the interior rectangular walls of the cabinet, means forming a compartment in one of the substantially triangular prismatic spaces between the containing means and the interior walls of the cabinet, a beverage dispensing faucet positioned in said compartment, and closure means giving access to said compartment from the exterior of the cabinet.

7. A beverage cooling and dispensing apparatus comprising in combination a base member having an insulated top wall and adapted to support a barrel thereon, means forming insulated side walls removably mounted on said base and adapted to enclose said barrel, and a top member removably supported on said side walls, said top member comprising an insulated horizontal wall and a unitary mechanical refrigerating device having a refrigerant evaporating unit beneath the wall and a refrigerant liquefying unit above the wall.

8. A beverage cooling and dispensing apparatus comprising in combination a base member having an insulated top wall and adapted to support a barrel thereon, enclosing means forming insulated side and top walls mounted on said base to enclose said barrel and refrigerating means associated with said enclosing means, said enclosing means being removable from said base while a barrel is supported thereon to facilitate removal and replacement of the barrel on the base.

9. In a beverage cooling and dispensing device, the combination of a rectangular cabinet adapted to receive two containers of beverage to be cooled and dispensed, means for cooling the interior of the cabinet, two circular beverage containers supported in said cabinet, means defining a compartment in said cabinet adjacent a wall thereof, a dispensing faucet positioned in said compartment, a two-way valve, connections between each of said containers and said two-way valve and between said two-way valve and said faucet, and means in said compartment for operating said two-way valve.

10. In a beverage cooling and dispensing device, the combination of a rectangular cabinet adapted to receive two containers of beverage to be cooled and dispensed, means for cooling the interior of the cabinet, two circular beverage containers supported in said cabinet, means defining a compartment in said cabinet adjacent a wall thereof, a dispensing faucet positioned in said compartment, a two-way valve, connections between each of said containers and said two-way valve and between said two-way valve and said faucet, means in said compartment for operating said two-way valve, and closure means in said cabinet giving access to said compartment from the outside.

11. In a beverage cooling and dispensing device, the combination of a rectangular cabinet adapted to receive two containers of beverage to be cooled and dispensed, means for cooling the interior of the cabinet, two circular beverage containers of a diameter such that the two containers are substantially circumscribed by the interior rectangular walls of the cabinet, and a beverage dispensing faucet positioned in a substantially triangular prismatic space between the containers and an interior wall of the cabinet.

12. In a beverage cooling and dispensing apparatus, the combination of a cabinet adapted to receive a barrel containing a beverage to be cooled and dispensed, refrigerating means including a cooling element at the top of the cabinet for inducing a circulation of a cooling medium in the cabinet, a beverage dispensing faucet communicating with the barrel in the cabinet, means for supporting said faucet in the circulating cooling medium, closure means at one side of said cabinet giving access to said faucet and larger closure means at an opposite side of the cabinet permitting insertion and removal of said barrel therethrough.

13. In a beverage cooling and dispensing apparatus, the combination of a cabinet for a beverage container, cooling means for the cabinet, a vertical partition in the cabinet forming a compartment adjacent a side of the cabinet, a dispensing faucet mounted in said compartment, said partition defining horizontal openings above and below said faucet for maintaining circulation of cooled air through said compartment.

14. In a beverage cooling and dispensing apparatus, the combination of a cabinet adapted to receive a large container such as a barrel, keg or the like containing a beverage to be cooled and dispensed, refrigerating means including a cooling element at the top of the cabinet for inducing a circulation of a cooling medium in the cabinet, means defining a faucet receiving compartment within said cabinet, a beverage dispensing faucet mounted within said compartment and communicating with the barrel or keg in the cabinet, and said faucet being in the cooling medium circulating within said cabinet.

15. In a beverage cooling and dispensing apparatus, the combination of a cabinet adapted to receive a large container such as a barrel, keg or the like containing a beverage to be cooled and dispensed, refrigerating means including a cooling element at the top of the cabinet for inducing a circulation of a cooling medium in the cabinet, means defining a faucet receiving compartment within said cabinet, a beverage dispensing faucet mounted within said compartment and communicating with the barrel or keg in the cabinet, said faucet being in the cooling medium circulating within said cabinet, and closure means for said compartment giving access to the faucet.

16. In a beverage cooling and dispensing apparatus, the combination of a rectangular cabinet adapted to receive a large container such as a barrel, keg or the like containing a beverage to be cooled and dispensed, means for cooling the interior of the cabinet, means in the cabinet forming a compartment adjacent a corner thereof, a beverage dispensing faucet mounted in said compartment, and closure means in said corner of the cabinet giving access to the faucet.

17. In a beverage cooling and dispensing apparatus, the combination of a cabinet adapted to receive a large container such as a barrel, keg or the like containing a beverage to be cooled and dispensed, means for cooling and causing circulation of air within said cabinet, means defining a faucet receiving compartment within said cabinet, a beverage dispensing faucet mounted within said compartment and communicating with the barrel or keg in the cabinet, and said faucet receiving compartment defining means being arranged to position said faucet in the path of cool air circulating within said cabinet.

18. In a beverage cooling and dispensing apparatus, the combination of a cabinet adapted to receive a large container such as a barrel, keg or the like containing a beverage to be cooled and dispensed, means for cooling and causing circulation of air within said cabinet, means defining a faucet receiving compartment within said cabinet, a beverage dispensing faucet mounted within said compartment and communicating with the barrel or keg in the cabinet, said faucet receiving compartment defining means being arranged to position said faucet in the path of cool air circulating within said cabinet, said compartment having an opening leading to the exterior of said cabinet and affording access to the faucet disposed therein, and movable means for closing said compartment access opening.

19. In a beverage cooling and dispensing apparatus, the combination of a cabinet adapted to receive a large container such as a barrel, keg or the like containing a beverage to be cooled and dispensed, means defining a faucet receiving compartment within said cabinet, a beverage dispensing faucet mounted within said compartment, conduit means connecting said faucet into communication with the barrel or keg in the cabinet, means for cooling the interior of said cabinet and for inducing a circulation of cool air over said barrel or keg and over said conduit means, and said faucet receiving compartment defining means being arranged to position said faucet in the path of cool air circulating within said cabinet.

20. In a beverage cooling and dispensing apparatus, the combination of a cabinet adapted to receive a large container such as a barrel, keg or the like containing a beverage to be cooled and dispensed, means defining a faucet receiving compartment within said cabinet, a beverage dispensing faucet mounted within said compartment, conduit means connecting said faucet into communication with the barrel or keg in the cabinet, means for cooling the interior of said cabinet and for inducing a circulation of cool air over said barrel or keg and over said conduit means, said faucet receiving compartment defining means being arranged to position said faucet in the path of cool air circulating within said cabinet, said compartment having an opening leading to the exterior of said cabinet and affording access to the faucet disposed therein, and movable means for closing said compartment access opening.

ANDREW A. KUCHER.